US007179876B2

(12) United States Patent
Szul et al.

(10) Patent No.: US 7,179,876 B2
(45) Date of Patent: Feb. 20, 2007

(54) HIGH TEAR FILMS FROM HAFNOCENE CATALYZED POLYETHYLENES

(75) Inventors: John F. Szul, Hurricane, WV (US); James McLeod Farley, League City, TX (US); Laughlin G. McCullough, League City, TX (US); Ryan Winston Impelman, Houston, TX (US)

(73) Assignee: Univation Technologies, LLC, Houston, TX (US)

( * ) Notice: Subject to any disclaimer, the term of this patent is extended or adjusted under 35 U.S.C. 154(b) by 0 days.

(21) Appl. No.: 11/098,077

(22) Filed: Apr. 4, 2005

(65) Prior Publication Data

US 2005/0171283 A1 Aug. 4, 2005

Related U.S. Application Data

(60) Division of application No. 10/737,654, filed on Dec. 15, 2003, now Pat. No. 6,936,675, which is a continuation-in-part of application No. 10/199,446, filed on Jul. 19, 2002, now Pat. No. 6,956,088.

(60) Provisional application No. 60/306,600, filed on Jul. 19, 2001.

(51) Int. Cl.
 C08F 210/16 (2006.01)
 C08F 4/64 (2006.01)
 C35B 27/32 (2006.01)

(52) U.S. Cl. .................. 526/348.2; 526/160; 526/165; 526/352; 428/523

(58) Field of Classification Search ................ 428/523; 526/129, 160, 165, 348.2, 352
See application file for complete search history.

(56) References Cited

U.S. PATENT DOCUMENTS

| | | | |
|---|---|---|---|
| 3,721,269 A | 3/1973 | Choate et al. .............. 138/119 |
| 3,966,378 A | 6/1976 | Valyi ...................... 425/242 B |
| 4,226,905 A | 10/1980 | Harbourne ................. 428/220 |
| 4,303,710 A | 12/1981 | Bullard et al. ................ 428/35 |
| 4,692,496 A | 9/1987 | Bahl et al. .................. 525/240 |
| 4,704,491 A | 11/1987 | Tsutsui et al. ................ 585/10 |
| 4,935,474 A | 6/1990 | Ewen et al. ................ 526/114 |
| 4,937,299 A | 6/1990 | Ewen et al. ................ 526/119 |
| 5,084,534 A | 1/1992 | Welborn, Jr. et al. ....... 526/160 |
| 5,086,134 A | 2/1992 | Antberg et al. ............. 526/126 |
| 5,093,189 A | 3/1992 | Yamawaki ................. 428/220 |
| 5,218,071 A | 6/1993 | Tsutsui et al. .............. 526/348 |
| 5,256,359 A | 10/1993 | Hahm ................... 264/211.12 |
| 5,258,475 A | 11/1993 | Kissin ........................ 526/129 |
| 5,317,036 A | 5/1994 | Brady, III et al. .......... 523/223 |
| 5,324,800 A | 6/1994 | Welborn, Jr. et al. ....... 526/160 |
| 5,359,015 A | 10/1994 | Jejelowo ..................... 526/114 |
| 5,374,700 A | 12/1994 | Tsutsui et al. ............ 526/348.3 |
| 5,382,630 A | 1/1995 | Stehling et al. ............. 525/240 |
| 5,382,631 A | 1/1995 | Stehling et al. ............. 525/240 |
| 5,387,660 A | 2/1995 | Doyle et al. .................. 526/69 |
| 5,459,217 A | 10/1995 | Todo et al. .............. 526/348.1 |
| 5,514,455 A | 5/1996 | Michie, Jr. et al. ......... 428/220 |
| 5,523,435 A | 6/1996 | Lisowsky ..................... 556/11 |
| 5,525,689 A | 6/1996 | Tsutsui et al. .............. 526/160 |
| 5,541,272 A | 7/1996 | Schmid et al. ............. 526/160 |
| 5,608,019 A | 3/1997 | Cheruvu et al. ............ 526/129 |
| 5,635,262 A | 6/1997 | Best et al. ................ 428/36.92 |
| 5,639,842 A | 6/1997 | Tsutsui et al. .............. 526/348 |
| 5,679,812 A | 10/1997 | Winter et al. .................. 556/7 |
| 5,714,426 A | 2/1998 | Tsutsui et al. .............. 502/117 |
| 5,739,225 A | 4/1998 | Tazaki et al. ............... 526/127 |

(Continued)

FOREIGN PATENT DOCUMENTS

EP 0284707 B1 10/1988

(Continued)

OTHER PUBLICATIONS

Colin Li Pi Shan, Joao B.P. Soares, Alexander Penlidis, "Ethylene/1-Octene Copolymerization Studies with In Situ Supported Metallocene Catalysts: Effect of Polymerization Parameters on the Catalyst Activity and Polymer Microstructure," Institute for Polymer Research, Dept. of Chem. Eng., University of Waterloo, Waterloo, Ontario N2L 3G1, pp. 4426-4451.

(Continued)

Primary Examiner—Caixia Lu
(74) Attorney, Agent, or Firm—Kevin M. Faulkner; Leandro Arechederra

(57) ABSTRACT

A polyethylene film having a balance of improved physical and mechanical properties and a method for making the same are provided. In one aspect, the film includes a 1% secant modulus of greater than 25,000 psi, a dart impact resistance of greater than 500 g/mil, and a MD tear strength of greater than 500 g/mil. In one aspect, the method comprises reacting ethylene derived units and a comonomer in the presence of a hafnium-based metallocene at a temperature of from 70° C. and 90° C., an ethylene partial pressure of from 120 psia and 260 psia, and a comonomer to ethylene ratio of from 0.01 to 0.02 to produce an ethylene based polymer. The method further comprises extruding the ethylene based polymer at conditions sufficient to produce a polyethylene film comprising a secant modulus of greater than 25,000 psi, a dart impact resistance of greater than 500 g/mil, and a MD tear strength of greater than 500 g/mil.

19 Claims, No Drawings

U.S. PATENT DOCUMENTS

| | | | |
|---|---|---|---|
| 5,744,551 A | 4/1998 | Kupperblatt et al. | 525/240 |
| 5,767,208 A | 6/1998 | Turner et al. | 526/160 |
| 5,786,495 A | 7/1998 | Resconi et al. | 556/11 |
| 5,874,513 A | 2/1999 | Watanabe et al. | 526/348.1 |
| 5,886,202 A | 3/1999 | Jung et al. | 556/11 |
| 5,904,964 A | 5/1999 | Snyder | 428/35.1 |
| 5,907,021 A | 5/1999 | Turner et al. | 526/160 |
| 5,916,988 A | 6/1999 | Tsutsui et al. | 526/348 |
| 5,929,264 A | 7/1999 | Rohrmann et al. | 556/11 |
| 5,962,615 A | 10/1999 | Kojoh et al. | 526/348.2 |
| 5,990,253 A | 11/1999 | Van Beek et al. | 526/127 |
| 6,051,728 A | 4/2000 | Resconi et al. | 556/53 |
| 6,054,542 A | 4/2000 | Kojoh et al. | 526/124.3 |
| 6,111,019 A | 8/2000 | Arjunan et al. | 525/211 |
| 6,214,469 B1 | 4/2001 | Sukhadia et al. | 428/421 |
| 6,242,545 B1 | 6/2001 | Jejelowo et al. | 526/160 |
| 6,248,845 B1 | 6/2001 | Loveday et al. | 526/113 |
| 6,255,426 B1 | 7/2001 | Lue et al. | 526/348 |
| 6,340,532 B1 | 1/2002 | Huang et al. | 428/523 |
| 6,346,576 B1 | 2/2002 | Takahashi | 525/191 |
| 6,355,733 B1 | 3/2002 | Williams et al. | 525/191 |
| 6,437,047 B1 | 8/2002 | Cecchin et al. | 525/191 |
| 6,441,116 B1 | 8/2002 | Shikuma et al. | 526/348 |
| 6,469,103 B1 | 10/2002 | Jain et al. | 525/240 |
| 6,528,597 B2 | 3/2003 | Loveday et al. | 526/113 |
| 6,552,138 B1 | 4/2003 | Kimura | 526/160 |
| 6,613,841 B2 | 9/2003 | Williams | 525/191 |
| 7,060,765 B2 | 6/2006 | Vaughan et al. | 526/127 |
| 2001/0018505 A1 | 8/2001 | Jejelowo et al. | 526/348.2 |
| 2001/0020074 A1 | 9/2001 | Jejelowo et al. | 526/127 |
| 2001/0031698 A1 | 10/2001 | Loveday et al. | 502/155 |
| 2002/0040114 A1 | 4/2002 | Loveday et al. | 526/160 |

FOREIGN PATENT DOCUMENTS

| | | |
|---|---|---|
| EP | 0413326 A2 | 2/1991 |
| EP | 0443686 A2 | 8/1991 |
| EP | 0481480 A1 | 4/1992 |
| EP | 0495099 A1 | 7/1992 |
| EP | 0773239 A2 | 5/1994 |
| EP | 0612768 B1 | 8/1994 |
| EP | 0596553 A2 | 11/1994 |
| EP | 0664301 | 7/1995 |
| EP | 0669346 A1 | 8/1995 |
| EP | 07841789 A2 | 7/1997 |
| EP | 0511665 | 7/1998 |
| EP | 0926169 | 6/1999 |
| FR | 09716011 | 4/1999 |
| JP | 59114029 | 6/1984 |
| JP | 61179738 | 8/1986 |
| JP | 2001254282 | 3/2003 |
| WO | 84/02707 | 7/1984 |
| WO | WO 90/03414 | 4/1990 |
| WO | WO 94/03509 | 2/1994 |
| WO | 0612768 A1 | 8/1994 |
| WO | WO 97/22635 | 6/1997 |
| WO | WO 97/44371 | 11/1997 |
| WO | WO 98/02470 | 1/1998 |
| WO | WO 98/28350 | 7/1998 |
| WO | WO 99/65957 | 12/1999 |
| WO | WO 00/31088 | 6/2000 |

OTHER PUBLICATIONS

Tian, Jun and Huang, Baotong, "*Ethylene polymerization with catalyst systems based on metallocenes with varying steric hindrance and methylaluminoxane*" Macromol. Rapid Commun., 15, 923-928 (1994).

U.S. Appl. No. 60/306,503, filed Jul. 19, 2001, Vaughan et al.

U.S. Appl. No. 60/306,903, filed Jul.19, 2001, Vaughan et al.

Patel, Rajen M., et al.; Investigation of Processing-Structure-Properties Relationships in Polyethylene Blown Films, *Polymer Engineering and Science*, (Mid-Oct. 1994), vol. 34, No. 19, pp. 1506-1514.

Krishnaswamy, R.K., et al., Orientation Characteristics of LLDPE Blown Films and Their Implications on Elmendorf Tear Performance, *Polymer* 41 (2000), pp. 9205-9217.

Rifi, M.R., "Flexomer™ Polyolefins, A Unique Class Of Polyolefins For Film Applications," *Society of Plastics Engineers Polyolefins VII International Conference*, (1991), pp. 373-391.

Hermann, W. A., et al., "First Example of a Soluble, Ethylene-Selective Ziegler Catalyst of the Zircanocene Class." *Angew. Chem.* 101 (1989) Nr. 11, pp. 1536-1538.

Usami, T., et al.,"Generation Mechanism of Short-Chain Branching Distribution in Linear Low-Density Polyethylenes," *Macromolecules* (1986), 19, pp. 2722-2726.

Speed, C.S., et al.,"Structure/Property Relationships in Fxxpol™ Polymers," *Society of Plastices Engineers Polyolefins VII International Conference, Houston, TX (Feb. 24-27, 1991)*.

US 7,179,876 B2

HIGH TEAR FILMS FROM HAFNOCENE CATALYZED POLYETHYLENES

CROSS-REFERENCE TO RELATED APPLICATIONS

This application is a divisional of U.S. patent application Ser. No. 10/737,654, filed Dec. 15, 2003, U.S. Pat. No. 6,936,675 which is a continuation-in-part of U.S. patent application Ser. No. 10/199,446, filed Jul. 19, 2002 U.S. Pat. No. 6,956,088 which claims benefit of provisional application Ser. No. 60/306,600, filed Jul. 19, 2001. Each of the aforementioned related patent applications are herein incorporated by reference.

BACKGROUND OF THE INVENTION

1. Field of the Invention

The present invention relates to films that exhibit a superior balance of physical properties. The films are produced with polyethylenes having a broad composition distribution (CD) and molecular weight distribution (MWD).

2. Description of the Related Art

Metallocene-catalyzed ethylene polymers are known to produce tough films measured in terms of dart drop impact strength (dart). Conventional Ziegler-Natta catalyzed linear low density polyethylenes (Z-N LLDPE) are known to have good processability, stiffness and tear strength, as measured by extruder pressures and motor load, 1% secant modulus, and Elmendorf tear strength. Ideally, a polyethylene resin would have Z-N LLDPE processability and produce a film exhibiting a combination of metallocene like toughness and Ziegler-Natta like stiffness and tear strength. It is possible to improve the toughness of films (e.g. MD tensile strength) by increasing the amount of orientation in the machine direction during film blowing. However, conventional knowledge in the polyethylene film art says that by increasing the machine direction (MD) orientation in films during manufacture of these films, other physical properties, such as MD tear strength, will decrease.

To this point, in *Polymer Engineering and Science*, mid-October 1994, vol. 34, No. 19, the disclosure of which is incorporated herein by reference, the authors discuss processing structure properties relationships in polyethylene blown film. The authors suggest that MD Elmendorf tear is found to be inversely related to drawdown ratio and MD shrinkage.

Further, in *Polymer*, 41 (2000) 9205–9217, the disclosure of which is incorporated herein by reference, the authors suggest that at high MD extension rates, a greater number of molecules will be oriented along the MD prior to the onset of crystallization, and that this is detrimental from a MD tear performance perspective.

Metallocene catalyst components can be combined to form blend compositions as described in PCT publication WO 90/03414 published Apr. 5, 1990, the disclosure of which is incorporated herein by reference. Also mixed metallocenes as described in U.S. Pat. Nos. 4,937,299 and 4,935,474, the disclosure of both which are incorporated herein by reference, can be used to produce polymers having a broad molecular weight distribution and/or a multimodal molecular weight distribution.

U.S. Pat. No. 5,514,455 suggests that a reduction in gauge of polyethylene films results in an increase in tear values. This document employs a titanium magnesium catalyst for polyethylene production and includes titanium residues in the polyethylene. Reported values of Elmendorf machine direction (MD) tear to transverse direction (TD) tear, are in the range of 0.1–0.3 for inventive examples.

U.S. Pat. No. 5,744,551, the disclosure of which is incorporated herein by reference, suggests a balance of tear property improvement. This document also employs a titanium magnesium catalyst for polyethylene production and includes titanium residues in the polyethylene. Further, the MD/TD tear ratios are in the range of 0.63–0.80 for inventive examples.

U.S. Pat. No. 5,382,630, the disclosure of which is incorporated herein by reference, discloses linear ethylene interpolymer blends made from components that can have the same molecular weight but different comonomer contents, or the same comonomer contents but different molecular weights, or comonomer contents which increase with molecular weight. U.S. Pat. No. 5,382,630 suggests multimodal polyethylene blends for which tear strength can be controlled. However, this document uses only intrinsic tear, and is silent on Elmendorf MD/TD tear ratios and on any other values but intrinsic tear.

Also, in U.S. Pat. No. 6,242,545 and U.S. Pat. No. 6,248,845 as well as provisional applications U.S. Ser. No. 60/306,503 filed Jul. 19, 2001 and 60/306,903 filed Jul. 19, 2001, the disclosures of all which are incorporated herein by reference, the patentees/applicants of these documents reported production of either broad composition distribution, narrow molecular weight, or broad composition distribution, relatively broad molecular weight distribution polyethylenes. However, these documents show an improvement in cast film MD tear, but no appreciable improvement for blown film.

There is a need, therefore, for a polyolefin film, more specifically a blown polyethylene film, that has high machine direction tear (MD tear) and/or high transverse direction tear (TD tear), and/or high dart drop impact resistance (dart), made from a polyethylene that is easier to process than prior metallocene catalyst produced linear low density polyethylenes (mLLDPE). In other words it is desirable to have the processability, stiffness and tear strength of a ZN-LLDPE combined with the dart impact strength of a mLLDPE.

SUMMARY OF THE INVENTION

A polyethylene film having a balance of improved physical and mechanical properties and a method for making the same are provided. In one aspect, the film includes a 1% secant modulus of greater than 25,000 psi, a dart impact resistance of greater than 500 g/mil, and a MD tear strength of greater than 500 g/mil. In another aspect, the film comprises an ethylene based polymer produced in the presence of a hafnium-based metallocene within a gas phase reactor operated at a temperature of from 70° C. and 90° C. and at an ethylene partial pressure of from 120 psia and 260 psia.

In yet another aspect, a film is provided by extruding an ethylene based polymer produced in the presence of a hafnium-based metallocene within a gas phase reactor operated at a temperature of from 70° C. and 90° C. and at an ethylene partial pressure of from 120 psia and 260 psia, wherein the film comprises a 1% secant modulus of greater than 25,000 psi, a dart impact resistance of greater than 500 g/mil, and a MD tear strength of greater than 500 g/mil.

The method for producing a film having a balance of improved physical and mechanical properties comprises reacting ethylene derived units and a comonomer in the presence of a hafnium-based metallocene at a temperature of from 70° C. and 90° C., an ethylene partial pressure of from 120 psia and 260 psia, and a comonomer to ethylene ratio of from 0.01 to 0.02 to produce an ethylene based polymer. The method further comprises extruding the ethylene based polymer at conditions sufficient to produce a polyethylene film comprising a 1% secant modulus of greater than 25,000 psi, a dart impact resistance of greater than 500 g/mil, and a MD tear strength of greater than 500 g/mil.

DETAILED DESCRIPTION

Films having a unique balance of machine direction (MD) and transverse direction (TD) tear, and/or a simultaneously increasing MD tear with increasing MD shrinkage are provided. It has been surprisingly found that these improved properties are a result of a polymer having a broad comonomer distribution (CD) and molecular weight distribution (MWD). Further, it has been surprisingly found that the comonomer distribution and molecular weight distribution of the polymer are produced by controlling either the reactor temperature or ethylene partial pressure or both in the presence of a hafnium-based metallocene catalyst ("metallocene" or "hafnocene") or hafnocene catalyst system.

A "catalyst system" as used herein may include one or more polymerization catalysts, activators, supports/carriers, or any combination thereof, and the terms "catalyst" and "catalyst system" are intended to be used interchangeably herein. The term "supported" as used herein refers to one or more compounds that are deposited on, contacted with, vaporized with, bonded to, or incorporated within, adsorbed or absorbed in, or on, a support or carrier. The terms "support" or "carrier" for purposes of this specification are used interchangeably and are any support material, preferably a porous support material, including inorganic or organic support materials. Non-limiting examples of inorganic support materials include inorganic oxides and inorganic chlorides. Other carriers include resinous support materials such as polystyrene, functionalized or crosslinked organic supports, such as polystyrene, divinyl benzene, polyolefins, or polymeric compounds, zeolites, talc, clays, or any other organic or inorganic support material and the like, or mixtures thereof.

Catalyst Components and Catalyst Systems

Hafnocenes are generally described throughout in, for example, 1 & 2 METALLOCENE-BASED POLYOLEFINS (John Scheirs & W. Kaminsky eds., John Wiley & Sons, Ltd. 2000); G. G. Hlatky in 181 COORDINATION CHEM. REV. 243–296 (1999) and in particular, for use in the synthesis of polyethylene in 1 METALLOCENE-BASED POLYOLEFINS 261–377 (2000). The hafnocene compounds as described herein include "half sandwich" and "full sandwich" compounds having one or more Cp ligands (cyclopentadienyl and ligands isolobal to cyclopentadienyl) bound to a hafnium atom, and one or more leaving group(s) bound to the hafnium atom. Hereinafter, these compounds will be referred to as "hafnocenes," "metallocenes," or "metallocene catalyst components". The hafnocene may be supported on a support material in a particular embodiment as described further below, and may be supported with or without another catalyst component or components.

As used herein, in reference to Periodic Table "Groups" of Elements, the "new" numbering scheme for the Periodic Table Groups are used as in the CRC HANDBOOK OF CHEMISTRY AND PHYSICS (David R. Lide ed., CRC Press 81$^{st}$ ed. 2000).

The Cp ligands are one or more rings or ring system(s), at least a portion of which includes π-bonded systems, such as cycloalkadienyl ligands and heterocyclic analogues. The ring(s) or ring system(s) typically comprise atoms selected from the group consisting of Groups 13 to 16 atoms, and more particularly, the atoms that make up the Cp ligands are selected from the group consisting of carbon, nitrogen, oxygen, silicon, sulfur, phosphorous, germanium, boron and aluminum and combinations thereof, wherein carbon makes up at least 50% of the ring members. Even more particularly, the Cp ligand(s) are selected from the group consisting of substituted and unsubstituted cyclopentadienyl ligands and ligands isolobal to cyclopentadienyl, non-limiting examples of which include cyclopentadienyl, indenyl, fluorenyl and other structures. Further non-limiting examples of such ligands include cyclopentadienyl, cyclopentaphenanthreneyl, indenyl, benzindenyl, fluorenyl, octahydrofluorenyl, cyclooctatetraenyl, cyclopentacyclododecene, phenanthrindenyl, 3,4-benzofluorenyl, 9-phenylfluorenyl, 8-H-cyclopent[a]acenaphthylenyl, 7H-dibenzofluorenyl, indeno[1,2–9]anthrene, thiophenoindenyl, thiophenofluorenyl, hydrogenated versions thereof (e.g., 4,5,6,7-tetrahydroindenyl, or "H$_4$Ind"), substituted versions thereof (as described in more detail below), and heterocyclic versions thereof.

In one aspect of the invention, the one or more metallocene catalyst components of the invention are represented by the formula (I):

$$Cp^A Cp^B HfX_n \qquad (I)$$

wherein each X is chemically bonded to Hf; each Cp group is chemically bonded to Hf; and n is 0 or an integer from 1 to 4, and either 1 or 2 in a particular embodiment.

The ligands represented by $Cp^A$ and $Cp^B$ in formula (I) may be the same or different cyclopentadienyl ligands or ligands isolobal to cyclopentadienyl, either or both of which may contain heteroatoms and either or both of which may be substituted by a group R. In one embodiment, $Cp^A$ and $Cp^B$ are independently selected from the group consisting of cyclopentadienyl, indenyl, tetrahydroindenyl, fluorenyl, and substituted derivatives of each.

Independently, each $Cp^A$ and $Cp^B$ of formula (I) may be unsubstituted or substituted with any one or combination of substituent groups R. Non-limiting examples of substituent groups R as used in structure (I) include hydrogen radicals, alkyls, alkenyls, alkynyls, cycloalkyls, aryls, acyls, aroyls, alkoxys, aryloxys, alkylthiols, dialkylamines, alkylamidos, alkoxycarbonyls, aryloxycarbonyls, carbomoyls, alkyl- and dialkyl-carbamoyls, acyloxys, acylaminos, aroylaminos, and combinations thereof.

More particular non-limiting examples of alkyl substituents R associated with formula (I) through (V) include methyl, ethyl, propyl, butyl, pentyl, hexyl, cyclopentyl, cyclohexyl, benzyl, phenyl, methylphenyl, and tert-butylphenyl groups and the like, including all their isomers, for example tertiary-butyl, isopropyl, and the like. Other possible radicals include substituted alkyls and aryls such as, for example, fluoromethyl, fluroethyl, difluroethyl, iodopropyl, bromohexyl, chlorobenzyl and hydrocarbyl substituted organometalloid radicals including trimethylsilyl, trimethylgermyl, methyldiethylsilyl and the like; and halocarbyl-substituted organometalloid radicals including tris(trifluoromethyl)silyl, methylbis(difluoromethyl)silyl, bromomethyldimethylgermyl and the like; and disubstituted boron radicals including dimethylboron for example; and disubstituted Group 15 radicals including dimethylamine, dimethylphosphine, diphenylamine, methylphenylphosphine, Group 16 radicals including methoxy, ethoxy, propoxy, phenoxy, methylsulfide and ethylsulfide. Other substituents R include olefins such as but not limited to olefinically unsaturated substituents including vinyl-terminated ligands, for example 3-butenyl, 2-propenyl, 5-hexenyl and the like. In one embodiment, at least two R groups, two adjacent R groups in one embodiment, are joined to form a ring structure having from 3 to 30 atoms selected from the group consisting of carbon, nitrogen, oxygen, phosphorous, silicon, germanium, aluminum, boron and combinations thereof. Also, a substituent group R group such as 1-butanyl may form a bonding association to the hafnium atom.

Each X in the formula (I) above and for the formulas/structures (II) through (V) below is independently selected from the group consisting of: any leaving group in one embodiment; halogen ions, hydrides, $C_1$ to $C_{12}$ alkyls, $C_2$ to $C_{12}$ alkenyls, $C_6$ to $C_{12}$ aryls, $C_7$ to $C_{20}$ alkylaryls, $C_1$ to $C_{12}$ alkoxys, $C_6$ to $C_{16}$ aryloxys, $C_7$ to $C_{18}$ alkylaryloxys, $C_1$ to $C_{12}$ fluoroalkyls, $C_6$ to $C_{12}$ fluoroaryls, and $C_1$ to $C_{12}$ heteroatom-containing hydrocarbons and substituted derivatives thereof in a more particular embodiment; hydride, halogen ions, $C_1$ to $C_6$ alkyls, $C_2$ to $C_6$ alkenyls, $C_7$ to $C_{18}$ alkylaryls, $C_1$ to $C_6$ alkoxys, $C_6$ to $C_{14}$ aryloxys, $C_7$ to $C_{16}$ alkylaryloxys, $C_1$ to $C_6$ alkylcarboxylates, $C_1$ to $C_6$ fluorinated alkylcarboxylates, $C_6$ to $C_{12}$ arylcarboxylates, $C_7$ to $C_{18}$ alkylarylcarboxylates, $C_1$ to $C_6$ fluoroalkyls, $C_2$ to $C_6$ fluoroalkenyls, and $C_7$ to $C_{18}$ fluoroalkylaryls in yet a more particular embodiment; hydride, chloride, fluoride, methyl, phenyl, phenoxy, benzoxy, tosyl, fluoromethyls and fluorophenyls in yet a more particular embodiment; $C_1$ to $C_{12}$ alkyls, $C_2$ to $C_{12}$ alkenyls, $C_6$ to $C_{12}$ aryls, $C_7$ to $C_{20}$ alkylaryls, substituted $C_1$ to $C_{12}$ alkyls, substituted $C_6$ to $C_{12}$ aryls, substituted $C_7$ to $C_{20}$ alkylaryls and $C_1$ to $C_{12}$ heteroatom-containing alkyls, $C_1$ to $C_{12}$ heteroatom-containing aryls and $C_1$ to $C_{12}$ heteroatom-containing alkylaryls in yet a more particular embodiment; chloride, fluoride, $C_1$ to $C_6$ alkyls, $C_2$ to $C_6$ alkenyls, $C_7$ to $C_{18}$ alkylaryls, halogenated $C_1$ to $C_6$ alkyls, halogenated $C_2$ to $C_6$ alkenyls, and halogenated $C_7$ to $C_{18}$ alkylaryls in yet a more particular embodiment; fluoride, methyl, ethyl, propyl, phenyl, methylphenyl, dimethylphenyl, trimethylphenyl, fluoromethyls (mono-, di- and trifluoromethyls) and fluorophenyls (mono-, di-, tri-, tetra- and pentafluorophenyls) in yet a more particular embodiment.

Other non-limiting examples of X groups in formula (I) include amines, phosphines, ethers, carboxylates, dienes, hydrocarbon radicals having from 1 to 20 carbon atoms, fluorinated hydrocarbon radicals (e.g., $—C_6F_5$ (pentafluorophenyl)), fluorinated alkylcarboxylates (e.g., $CF_3C(O)O^-$), hydrides and halogen ions and combinations thereof. Other examples of X ligands include alkyl groups such as cyclobutyl, cyclohexyl, methyl, heptyl, tolyl, trifluoromethyl, tetramethylene, pentamethylene, methylidene, methyoxy, ethyoxy, propoxy, phenoxy, bis(N-methylanilide), dimethylamide, dimethylphosphide radicals and the like. In one embodiment, two or more X's form a part of a fused ring or ring system.

In another aspect, the metallocene catalyst component includes those of formula (I) where $Cp^A$ and $Cp^B$ are bridged to each other by at least one bridging group, (A), such that the structure is represented by formula (II):

(II)

These bridged compounds represented by formula (II) are known as "bridged metallocenes". $Cp^A$, $Cp^B$, X and n in structure (II) are as defined above for formula (I); and wherein each Cp ligand is chemically bonded to Hf, and (A) is chemically bonded to each Cp. Non-limiting examples of bridging group (A) include divalent hydrocarbon groups containing at least one Group 13 to 16 atom, such as but not limited to at least one of a carbon, oxygen, nitrogen, silicon, aluminum, boron, germanium and tin atom and combinations thereof; wherein the heteroatom may also be $C_1$ to $C_{12}$ alkyl or aryl substituted to satisfy neutral valency. The bridging group (A) may also contain substituent groups R as defined above (for formula (I)) including halogen radicals and iron. More particular non-limiting examples of bridging group (A) are represented by $C_1$ to $C_6$ alkylenes, substituted $C_1$ to $C_6$ alkylenes, oxygen, sulfur, R'$_2$C=, R'$_2$Si=, —Si(R')$_2$Si(R'$_2$)—, R'$_2$Ge=, R'P=(wherein "=" represents two chemical bonds), where R' is independently selected from the group consisting of hydride, hydrocarbyl, substituted hydrocarbyl, halocarbyl, substituted halocarbyl, hydrocarbyl-substituted organometalloid, halocarbyl-substituted organometalloid, disubstituted boron, disubstituted Group 15 atoms, substituted Group 16 atoms, and halogen radical; and wherein two or more R' may be joined to form a ring or ring system. In one embodiment, the bridged metallocene catalyst component of formula (II) has two or more bridging groups (A).

Other non-limiting examples of bridging group (A) include methylene, ethylene, ethylidene, propylidene, isopropylidene, diphenylmethylene, 1,2-dimethylethylene, 1,2-diphenylethylene, 1,1,2,2-tetramethylethylene, dimethylsilyl, diethylsilyl, methyl-ethylsilyl, trifluoromethylbutylsilyl, bis(trifluoromethyl)silyl, di(n-butyl)silyl, di(n-propyl)silyl, di(i-propyl)silyl, di(n-hexyl)silyl, dicyclohexylsilyl, diphenylsilyl, cyclohexylphenylsilyl, t-butylcyclohexylsilyl, di(t-butylphenyl)silyl, di(p-tolyl)silyl and the corresponding moieties wherein the Si atom is replaced by a Ge or a C atom; dimethylsilyl, diethylsilyl, dimethylgermyl and diethylgermyl.

In another embodiment, bridging group (A) may also be cyclic, comprising, for example 4 to 10, 5 to 7 ring members in a more particular embodiment. The ring members may be selected from the elements mentioned above, from one or more of B, C, Si, Ge, N and O in a particular embodiment. Non-limiting examples of ring structures which may be present as or part of the bridging moiety are cyclobutylidene, cyclopentylidene, cyclohexylidene, cycloheptylidene, cyclooctylidene and the corresponding rings where one or two carbon atoms are replaced by at least one of Si, Ge, N and O, in particular, Si and Ge. The bonding arrangement between the ring and the Cp groups may be either cis-, trans-, or a combination.

The cyclic bridging groups (A) may be saturated or unsaturated and/or carry one or more substituents and/or be fused to one or more other ring structures. If present, the one or more substituents are selected from the group consisting of hydrocarbyl (e.g., alkyl such as methyl) and halogen (e.g., F, Cl) in one embodiment. The one or more Cp groups which the above cyclic bridging moieties may optionally be fused to may be saturated or unsaturated and are selected from the group consisting of those having 4 to 10, more particularly 5, 6 or 7 ring members (selected from the group consisting of C, N, O and S in a particular embodiment) such as, for example, cyclopentyl, cyclohexyl and phenyl. Moreover, these ring structures may themselves be fused such as, for example, in the case of a naphthyl group. Moreover, these (optionally fused) ring structures may carry one or more substituents. Illustrative, non-limiting examples of these substituents are hydrocarbyl (particularly alkyl) groups and halogen atoms.

The ligands $Cp^A$ and $Cp^B$ of formula (I) and (II) are different from each other in one embodiment, and the same in another embodiment.

Some specific, non-limiting examples of hafnocenes include bis(n-propyl cyclopentadienyl) hafnium dichloride, bis(n-propyl cyclopentadienyl) hafnium difluoride, bis(n-propyl cyclopentadienyl) hafnium dimethyl, bis(n-propyl cyclopentadienyl) hafnium dihydride, bis(2-propenylcyclopentadienyl) hafnium dichloride, bis(2-propenylcyclopentadienyl) hafnium difluoride, bis(2-propenylcyclopentadienyl) hafnium dimethyl, bis(n-butyl cyclopentadienyl) hafnium dichloride, bis(n-butyl cyclopentadienyl) hafnium difluoride, bis(n-butyl cyclopentadienyl) hafnium dimethyl, bis(3-butenylcyclopentadienyl) hafnium dichloride, bis(3-butenylcyclopentadienyl) hafnium difluoride, bis(3-butenylcyclopentadienyl) hafnium dimethyl, bis(n-pentyl cyclopentadienyl) hafnium dichloride, bis(n-pentyl cyclopentadienyl) hafnium difluoride, bis(n-pentyl cyclopentadienyl) hafnium dimethyl, (n-propyl cyclopentadienyl)(n-butyl cyclopentadienyl) hafnium dichloride or dimethyl, bis (trimethylsilylmethylcyclopentadienyl) hafnium dichloride, bis[(2-trimethylsilyl-ethyl)cyclopentadienyl]hafnium dichloride or dimethyl, bis(trimethylsilyl cyclopentadienyl) hafnium dichloride or dimethyl or dihydride, bis(2-n-propyl indenyl) hafnium dichloride or dimethyl, bis(2-n-butyl indenyl) hafnium dichloride or dimethyl, dimethylsilyl bis(n-propyl cyclopentadienyl) hafnium dichloride or dimethyl, dimethylsilyl bis(n-butyl cyclopentadienyl) hafnium dichloride or dimethyl, bis(9-n-propyl fluorenyl) hafnium dichloride or dimethyl bis(9-n-butyl fluorenyl) hafnium dichloride or dimethyl, (9-n propyl fluorenyl)(2-n-propyl indenyl) hafnium dichloride or dimethyl, bis(1,2-n-propyl, methyl cyclopentadienyl) hafnium dichloride or dimethyl, bis(1,3-n-propylmethylcyclopentadienyl) hafnium dichloride, (n-propyl cyclopentadienyl) (1,3-n-propyl, n-butyl cyclopentadienyl) hafnium dichloride or dimethyl and the like.

Typically, the catalyst described above is activated towards olefin polymerization using one or more activators. As used herein, the term "activator" is defined to be any compound or combination of compounds, supported or unsupported, which can activate a single-site catalyst compound, such as a metallocene, by creating a cationic species from the catalyst component. Typically, this involves the abstraction of at least one leaving group from the metal center of the catalyst component. Embodiments of such activators include Lewis acids such as cyclic or oligomeric poly(hydrocarbylaluminum oxides) and so called non-coordinating activators ("NCA") (alternately, "ionizing activators" or "stoichiometric activators"), or any other compound that can convert a neutral metallocene catalyst component to a metallocene cation that is active with respect to olefin polymerization.

More particularly, it is within the scope of this invention to use Lewis acids such as alumoxane (e.g., "MAO"), modified alumoxane (e.g., "TIBAO"), and alkylaluminum compounds as activators, and/or ionizing activators (neutral or ionic) such as tri(n-butyl)ammonium tetrakis(pentafluorophenyl)boron and/or a trisperfluorophenyl boron metalloid precursors. MAO and other aluminum-based activators are well known in the art. Ionizing activators are well known in the art and are described by, for example, Eugene You-Xian Chen & Tobin J. Marks, *Cocatalysts for Metal-Catalyzed Olefin Polymerization: Activators, Activation Processes, and Structure-Activity Relationships* 100(4) CHEMICAL REVIEWS 1391–1434 (2000). The activators may be associated with or bound to a support, either in association with the catalyst component (e.g., metallocene) or separate from the catalyst component, such as described by Gregory G. Hlatky, *Heterogeneous Single-Site Catalysts for Olefin Polymerization* 100(4) CHEMICAL REVIEWS 1347–1374 (2000).

The aluminum alkyl ("alkylaluminum") activator may be described by the formula $AlR^\S_3$, wherein $R^\S$ is selected from the group consisting of $C_1$ to $C_{20}$ alkyls, $C_1$ to $C_{20}$ alkoxys, halogen (chlorine, fluorine, bromine) $C_6$ to $C_{20}$ aryls, $C_7$ to $C_{25}$ alkylaryls, and $C_7$ to $C_{25}$ arylalkyls. Non-limiting examples of aluminum alkyl compounds which may be utilized as activators for the catalyst precursor compounds for use in the methods of the present invention include trimethylaluminum, triethylaluminum, triisobutylaluminum, tri-n-hexylaluminum, tri-n-octylaluminum and the like.

In general, the activator and catalyst are combined in mole ratios of activator to catalyst component from 1000:1 to 0.1:1, and from 300:1 to 1:1 in another embodiment, and from 150:1 to 1:1 in yet another embodiment, and from 50:1 to 1:1 in yet another embodiment, and from 10:1 to 0.5:1 in yet another embodiment, and from 3:1 to 0.3:1 in yet another embodiment, wherein a desirable range may include any combination of any upper mole ratio limit with any lower mole ratio limit described herein. When the activator is a cyclic or oligomeric poly(hydrocarbylaluminum oxide) (e.g., "MAO"), the mole ratio of activator to catalyst component ranges from 2:1 to 100,000:1 in one embodiment, and from 10:1 to 10,000:1 in another embodiment, and from 50:1 to 2,000:1 in yet another embodiment. For a more complete discussion of exemplary hafnocene catalysts and activators, please refer to commonly assigned U.S. Pat. Nos. 6,242,545 and 6,248,845.

Polymerization Process

The catalysts described above are suitable for use in any olefin prepolymerization or polymerization process or both. Suitable polymerization processes include solution, gas phase, slurry phase and a high pressure process, or any combination thereof. A desirable process is a gas phase polymerization of one or more one or more olefin monomers having from 2 to 30 carbon atoms, from 2 to 12 carbon atoms in another embodiment, and from 2 to 8 carbon atoms in yet another embodiment. Other monomers useful in the process include ethylenically unsaturated monomers, diolefins having 4 to 18 carbon atoms, conjugated or nonconjugated dienes, polyenes, vinyl monomers and cyclic olefins. Non-limiting monomers may also include norbornene, norbornadiene, isobutylene, isoprene, vinylbenzocyclobutane, styrenes, alkyl substituted styrene, ethylidene norbornene, dicyclopentadiene and cyclopentene.

In a desirable embodiment, a copolymer of ethylene derived units and one or more monomers or comonomer is produced. The one or more comonomers are preferably an α-olefin having from 4 to 15 carbon atoms in one embodiment, and from 4 to 12 carbon atoms in another embodiment, and from 4 to 8 carbon atoms in yet another embodiment. Preferably, the comonomer is 1-hexene.

Hydrogen gas is often used in olefin polymerization to control the final properties of the polyolefin, such as described in Polypropylene Handbook 76–78 (Hanser Publishers, 1996). Increasing concentrations (partial pressures) of hydrogen increase the melt flow rate (MFR) and/or melt index (MI) of the polyolefin generated. The MFR or MI can thus be influenced by the hydrogen concentration. The amount of hydrogen in the polymerization can be expressed as a mole ratio relative to the total polymerizable monomer, for example, ethylene, or a blend of ethylene and hexane or propene. The amount of hydrogen used in the polymerization process of the present invention is an amount necessary to achieve the desired MFR or MI of the final polyolefin resin. In one embodiment, the mole ratio of hydrogen to total monomer ($H_2$:monomer) is in a range of from greater than 0.0001 in one embodiment, and from greater than 0.0005 in another embodiment, and from greater than 0.001 in yet another embodiment, and less than 10 in yet another embodiment, and less than 5 in yet another embodiment, and less than 3 in yet another embodiment, and less than 0.10 in yet another embodiment, wherein a desirable range may comprise any combination of any upper mole ratio limit with any lower mole ratio limit described herein. Expressed another way, the amount of hydrogen in the reactor at any time may range to up to 5000 ppm, and up to 4000 ppm in another embodiment, and up to 3000 ppm in yet another embodiment, and between 50 ppm and 5000 ppm in yet another embodiment, and between 100 ppm and 2000 ppm in another embodiment.

Typically in a gas phase polymerization process a continuous cycle is employed wherein one part of the cycle of a reactor system, a cycling gas stream, otherwise known as a recycle stream or fluidizing medium, is heated in the reactor by the heat of polymerization. This heat is removed from the recycle composition in another part of the cycle by a cooling system external to the reactor. Generally, in a gas fluidized bed process for producing polymers, a gaseous stream containing one or more monomers is continuously cycled through a fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer.

Further, it is common to use a staged reactor employing two or more reactors in series, wherein one reactor may produce, for example, a high molecular weight component and another reactor may produce a low molecular weight component. In one embodiment of the invention, the polyolefin is produced using a staged gas phase reactor. This and other commercial polymerization systems are described in, for example, 2 Metallocene-Based Polyolefins 366–378 (John Scheirs & W. Kaminsky, eds. John Wiley & Sons, Ltd. 2000). Gas phase processes contemplated by the invention include those described in U.S. Pat. No. 5,627,242, U.S. Pat. No. 5,665,818 and U.S. Pat. No. 5,677,375, and European publications EP-A-0 794 200 EP-B1-0 649 992, EP-A-0 802 202 and EP-B-634 421.

It has been surprising found that films having a unique balance of machine direction (MD) and transverse directions (TD) tear, and/or a simultaneously increasing MD tear with increasing MD shrinkage are produced when controlling the reactor temperature or ethylene partial pressure or both. Reactor temperature should vary between 60 and 120° C., preferably between 65 and 100° C., more preferably between 70 and 90° C., and most preferably between 75 and 80° C. For purposes of this patent specification and appended claims the terms "polymerization temperature" and "reactor temperature" are interchangeable.

The ethylene partial pressure should vary between 80 and 300 psia, preferably between 100 and 280 psia, more preferably between 120 and 260 psia, and most preferably between 140 and 240 psia. More importantly, a ratio of comonomer to ethylene in the gas phase should vary from 0.0 to 0.10, preferably between 0.005 and 0.05, more preferably between 0.007 and 0.030, and most preferably between 0.01 and 0.02.

Reactor pressure typically varies from 100 psig (690 kPa) to 500 psig (3448 kPa). In one aspect, the reactor pressure is maintained within the range of from 200 psig (1379 kPa) to 500 psig (3448 kPa). In another aspect, the reactor pressure is maintained within the range of from 250 psig (1724 kPa) to 400 psig (2759 kPa).

Polymer Products

The inventive polymers typically have a broad composition distribution as measured by Composition Distribution Breadth Index (CDBI) or solubility distribution breadth index (SDBI). Further details of determining the CDBI or SDBI of a copolymer are known to those skilled in the art. See, for example, PCT Patent Application WO 93/03093, published Feb. 18, 1993. Polymers produced using a catalyst system described herein have a CDBI less than 50%, more preferably less than 40%, and most preferably less than 30%. In one embodiment, the polymers have a CDBI of from 20% to less than 50%. In another embodiment, the polymers have a CDBI of from 20% to 35%. In yet another embodiment, the polymers have a CDBI of from 25% to 28%.

Polymers produced using a catalyst system described herein have a SDBI greater than 15° C., or greater than 16° C., or greater than 17° C., or greater than 18° C. or greater than 20° C. In one embodiment, the polymers have a SDBI of from 18° C. to 22° C. In another embodiment, the polymers have a SDBI of from 18.7° C. to 21.4° C. In another embodiment, the polymers have a SDBI of from 20° C. to 22° C.

In one aspect, the polymers have a density in the range of from 0.86 g/cc to 0.97 g/cc, preferably in the range of from 0.90 g/cc to 0.950 g/cc, more preferably in the range of from 0.905 g/cc to 0.940 g/cc, and most preferably in the range of from 0.910 g/cc to 0.930 g/cc. Density is measured in accordance with ASTM-D-1238.

The polymers have a molecular weight distribution, a weight average molecular weight to number average molecular weight ($M_w/M_n$) of greater than 2.0 to about 5, particularly greater than 2.5 to about 4.5, more preferably greater than about 3.0 to less than about 4.0, and most preferably from 3.2 to 3.8.

The polymers have a ratio of z-average molecular weight to weight average molecular weight of greater than 2.2 or greater than 2.5 or greater than 2.8. In one embodiment, this ratio is from about 2.2 and 3.0. In another embodiment, this ratio is from about 2.2 to about 2.8. In yet another embodiment, this ratio is from about 2.2 to about 2.5. In still yet another embodiment, this ratio is from about 2.4 to about 2.8.

The polymers made by the described processes can in certain embodiments have a melt index (MI) or ($I_2$) as measured by ASTM-D-1238-E (190/2.16) in the range from 0.1 to 100 dg/min, preferably between 0.2 and 20 dg/min, more preferably between 0.3 and 5 dg/min, and most preferably between 0.5 and 1.5 dg/min.

In one embodiment, the polymers have a melt index ratio ($I_{21}/I_2$) ($I_{21}$ is measured by ASTM-D-1238-F) (190/21.6) of from 20 to less than 50. The polymers, in a preferred embodiment, have a melt index ratio ($I_{21}/I_2$) of from greater than 22, more preferably greater than 25, most preferably greater that 30.

The polymers may be blended and/or coextruded with any other polymer. Non-limiting examples of other polymers include linear low density polyethylenes, elastomers, plastomers, high pressure low density polyethylene, high density polyethylenes, polypropylenes and the like.

Compounding, Processing and Articles Therefrom

The polymers produced may also be blended with additives to form compositions that can then be used in articles of manufacture. Those additives include antioxidants, nucleating agents, acid scavengers, plasticizers, stabilizers, anti-corrosion agents, blowing agents, other ultraviolet light absorbers such as chain-breaking antioxidants, etc., quenchers, antistatic agents, slip agents, pigments, dyes and fillers and cure agents such as peroxide. These and other common additives in the polyolefin industry may be present in polyolefin compositions from 0.01 to 50 wt % in one embodiment, and from 0.1 to 20 wt % in another embodiment, and from 1 to 5 wt % in yet another embodiment, wherein a desirable range may comprise any combination of any upper wt % limit with any lower wt % limit.

In particular, antioxidants and stabilizers such as organic phosphites and phenolic antioxidants may be present in the polyolefin compositions from 0.001 to 5 wt % in one embodiment, and from 0.01 to 0.8 wt % in another embodiment, and from 0.02 to 0.5 wt % in yet another embodiment. Non-limiting examples of organic phosphites that are suitable are tris(2,4-di-tert-butylphenyl)phosphite (IRGAFOS 168) and tris(nonyl phenyl) phosphite (WESTON 399) Non-limiting examples of phenolic antioxidants include octadecyl 3,5 di-t-butyl-4-hydroxyhydrocinnamate (IRGANOX 1076) and pentaerythrityl tetrakis(3,5-di-tert-butyl-4-hydroxyphenyl)propionate (IRGANOX 1010); and 1,3,5-Tri (3,5-di-tert-butyl-4-hydroxybenzyl-isocyanurate (IRGANOX 3114).

Fillers may be present from 0.1 to 50 wt % in one embodiment, and from 0.1 to 25 wt % of the composition in another embodiment, and from 0.2 to 10 wt % in yet another embodiment. Desirable fillers include but not limited to titanium dioxide, silicon carbide, silica (and other oxides of silica, precipitated or not), antimony oxide, lead carbonate, zinc white, lithopone, zircon, corundum, spinel, apatite, Barytes powder, barium sulfate, magnesiter, carbon black, dolomite, calcium carbonate, talc and hydrotalcite compounds of the ions Mg, Ca, or Zn with Al, Cr or Fe and $CO_3$ and/or $HPO_4$, hydrated or not; quartz powder, hydrochloric magnesium carbonate, glass fibers, clays, alumina, and other metal oxides and carbonates, metal hydroxides, chrome, phosphorous and brominated flame retardants, antimony trioxide, silica, silicone, and blends thereof. These fillers may particularly include any other fillers and porous fillers and supports known in the art.

Fatty acid salts may also be present in the polyolefin compositions. Such salts may be present from 0.001 to 2 wt % of the composition in one embodiment, and from 0.01 to 1 wt % in another embodiment. Examples of fatty acid metal salts include lauric acid, stearic acid, succinic acid, stearyl lactic acid, lactic acid, phthalic acid, benzoic acid, hydroxystearic acid, ricinoleic acid, naphthenic acid, oleic acid, palmitic acid, and erucic acid, suitable metals including Li, Na, Mg, Ca, Sr, Ba, Zn, Cd, Al, Sn, Pb and so forth. Desirable fatty acid salts are selected from magnesium stearate, calcium stearate, sodium stearate, zinc stearate, calcium oleate, zinc oleate, and magnesium oleate.

With respect to the physical process of producing the blend of polyolefin and one or more additives, sufficient mixing should take place to assure that a uniform blend will be produced prior to conversion into a finished product. The polyolefin can be in any physical form when used to blend with the one or more additives. In one embodiment, reactor granules, defined as the granules of polymer that are isolated from the polymerization reactor, are used to blend with the additives. The reactor granules have an average diameter of from 10 μm to 5 mm, and from 50 μm to 10 mm in another embodiment. Alternately, the polyolefin is in the form of pellets, such as, for example, having an average diameter of from 1 mm to 6 mm that are formed from melt extrusion of the reactor granules.

One method of blending the additives with the polyolefin is to contact the components in a tumbler or other physical blending means, the polyolefin being in the form of reactor granules. This can then be followed, if desired, by melt blending in an extruder. Another method of blending the components is to melt blend the polyolefin pellets with the additives directly in an extruder, Brabender or any other melt blending means.

The resultant polyolefin resin may be further processed by any suitable means such as by calendering, casting, coating, compounding, extrusion, foaming; all forms of molding including compression molding, injection molding, blow molding, rotational molding, and transfer molding; film blowing or casting and all methods of film formation to achieve, for example, uniaxial or biaxial orientation; thermoforming, as well as by lamination, pultrusion, protrusion, draw reduction, spinbonding, melt spinning, melt blowing, and other forms of fiber and nonwoven fabric formation, and combinations thereof. These and other forms of suitable processing techniques are described in, for example, Plastics Processing (Radian Corporation, Noyes Data Corp. 1986).

In the case of injection molding of various articles, simple solid state blends of the pellets serve equally as well as pelletized melt state blends of raw polymer granules, of granules with pellets, or of pellets of the two components since the forming process includes a remelting and mixing of the raw material. In the process of compression molding of medical devices, however, little mixing of the melt components occurs, and a pelletized melt blend would be preferred over simple solid state blends of the constituent pellets and/or granules. Those skilled in the art will be able to determine the appropriate procedure for blending of the polymers to balance the need for intimate mixing of the component ingredients with the desire for process economy. Common Theological properties, processing methods and end use applications of metallocene based polyolefins are discussed in, for example, 2 Metallocene-Based Polyolefins 400–554 (John Scheirs & W. Kaminsky, eds. John Wiley & Sons, Ltd. 2000).

The polymers produced and blends thereof are useful in such forming operations as film, sheet, and fiber extrusion and co-extrusion as well as blow molding, injection molding and rotary molding. Films include blown or cast films formed by coextrusion or by lamination useful as shrink film, cling film, stretch film, sealing films, oriented films, snack packaging, heavy duty bags, grocery sacks, baked and frozen food packaging, medical packaging, industrial liners, membranes, etc. in food-contact and nonfood contact applications. Fibers include melt spinning, solution spinning and melt blown fiber operations for use in woven or non-woven form to make filters, diaper fabrics, medical garments, geotextiles, etc. Extruded articles include medical tubing, wire and cable coatings, pipe, geomembranes, and pond liners. Molded articles include single and multi-layered constructions in the form of bottles, tanks, large hollow articles, rigid food containers and toys, etc.

Other desirable articles that can be made from and/or incorporate the polymer produced herein include automotive components, sporting equipment, outdoor furniture (e.g., garden furniture) and playground equipment, boat and water craft components, and other such articles. More particularly, automotive components include such as bumpers, grills, trim parts, dashboards and instrument panels, exterior door and hood components, spoiler, wind screen, hub caps, mirror housing, body panel, protective side molding, and other interior and external components associated with automobiles, trucks, boats, and other vehicles.

Further useful articles and goods include crates, containers, packaging material, labware, office floor mats, instrumentation sample holders and sample windows; liquid storage containers for medical uses such as bags, pouches, and bottles for storage and IV infusion of blood or solutions; wrapping or containing food preserved by irradiation, other medical devices including infusion kits, catheters, and respiratory therapy, as well as packaging materials for medical devices and food which may be irradiated by gamma or ultraviolet radiation including trays, as well as stored liquid, particularly water, milk, or juice, containers including unit servings and bulk storage containers.

Film Extrusion and Film Properties

The polymers produced are more easily extruded into film products by cast or blown film processing techniques with lower motor load, higher throughput and/or reduced head pressure as compared to EXCEED™ resins (available from ExxonMobil Chemical Co.) of comparable melt index, comonomer type and density. Such polyolefin resins have, for a comparable MI, a higher weight average molecular weight and a broader MWD than does an EXCEED™ resin.

The improvement in tear properties of the film can be expressed as a ratio of MD to TD tear (Elmendorf). This ratio will generally be $\geq 0.9$, or $\geq 1.0$, or $\geq 1.1$, or $\geq 1.2$, or $\geq 1.3$. In another embodiment, MD tear values of $\geq 350$ g/mil, or $\geq 400$ g/mil, or $\geq 450$ g/mil or $\geq 500$ g/mil are contemplated. Intrinsic tear, determined by using the same test as both MD and TD tear, but prepared by compression molding a plaque, is generally believed to be greater than MD tear for LLDPE materials. However, the Elmendorf tear divided by intrinsic tear will be $\geq 1$, or $\geq 1.1$, or $\geq 1.2$, or $\geq 1.4$, or $\geq 1.6$. In other embodiments, the dart drop impact resistance (dart) is $\geq 500$ g/mil ($\pm 500$ g/0.254 mm) as measured by ASTM D-1709.

The polymers produced will exhibit a weight average molecular weight of from 25,000 to 200,000 at corresponding MI ($I_2$, 190° C./2.16 kg) values that range between 10 and 0.1 dg/mil, and the weight average molecular weight ranges from 80,000 to 150,000 within which range the melt index respectively ranges from a value of 3 to 0.5 dg/min. For such polyolefin resins, the melt index ratio (MIR defined by $I_{21}/I_2$ described herein) is $\geq 20$ or $\leq 40$, and $\geq 25$ or $\leq 38$.

The film may have a total thickness ranging from $\geq 0.1$, or $\geq 0.2$, or $\geq 0.3$ mils, ($\geq 2.5$ or $\geq 5.1$ or $\geq 7.6$ microns) or $\leq 3$ or $\leq 2.5$, or $\leq 2$, or $\leq 1.5$, or $\leq 1$, or $\leq 0.8$, or $\leq 0.75$, or $\leq 0.6$ mils ($\leq 76$ or $\leq 64$, or $\leq 51$, or $\leq 38$, or $\leq 25$, or $\leq 20$, or $\leq 19$, or $\leq 15$ microns. Typical die gaps range from 30–120 mils, or 60–110 mils. Melt temperatures range from 176° C.–288° C. (350–550° F.), or 198 C.–232° C. (390–450° F.). Draw down ratios range from 20–50, or around 30–40.

For a 0.75 mil film for example, tensile strength may vary from 7000 to 12000 psi, preferably from 7500 to 12000 psi, more preferably from 8000 to 11000 psi, and most preferably from 8500 to 10500 psi; and Elmendorf tear in the machine direction may vary from 300 to 1000 g/mil, preferably between 350 and 900 g/mil, more preferably between 400 and 800 g/mil and most preferably between 500 and 750 g/mil.

The 1% secant modulus as measured by ASTM D-790 is greater than 10,000 psi, greater than 15,000 psi, greater than 20,000 psi, greater than 25,000 psi, and greater than 35,000 psi. Preferably, the 1% secant modulus is greater than 20,000 psi. More preferably, the 1% secant modulus is greater than 23,000 psi. Most preferably, the 1% secant modulus is greater than 25,000 psi.

EXAMPLES

In order to provide a better understanding of the foregoing discussion, the following non-limiting examples are offered. Although the examples may be directed to specific embodiments, they are not to be viewed as limiting the invention in any specific respect.

All parts, proportions, and percentages are by weight unless otherwise indicated. All examples were carried out in dry, oxygen-free environments and solvents. All molecular weights are weight average molecular weight unless otherwise noted. Molecular weights (weight average molecular weight ($M_w$) and number average molecular weight ($M_n$) and ($M_z$) were measured by Gel Permeation Chromatography (GPC).

Definitions and Testing Periods

| | | |
|---|---|---|
| Melt Index (MI) | g/10 min. | ASTM D-1238, condition E@ 190° C. |
| Density | g/cc | ASTM-D-1238 |
| Dart Drop Impact $F_{50}$ | G and g/mil | ASTM D-1709 |
| Elmendorf Tear | G (g/mil) | ASTM-D-1922 |
| Secant Modulus (1%) | Psi | ASTM D-790A |

Melt strength was measured at 190° C. using a commercial instrument (Rheotester 1000) from Goettfert, Germany. CRYSTAF data was obtained using a commercial instrument (Model 200) from PolymerChar S.A., Valencia, Spain. Using a technique outlined in Macromol. Mater. Eng. 279, 46–51 (2000). Approximately 30 mg sample was heated to 160° C. at 25° C./min in 30 mL of a chlorinated aromatic solvent (ortho-dichlorobenzene or trichlorobenzene) with stirring and held for 60 min. The solution was then cooled to 100° C. at 25° C./min and equilibrated for 45 min. The concentration was then monitored as the sample was cooled to 30° C. at 0.2° C./min.

Catalyst Preparation

1. Preparation of Bis(propylcyclopentadienyl)hafnium dichloride: $(PrCp)_2HfCl_2$.

$HfCl_4$ (30.00 g, 93.7 mmol, 1.00 equiv.) was added to ether (400 mL) at −35° C. and stirred to give a white suspension. The suspension was recooled to −35° C. and then lithium propylcyclopentadienide (21.38 g, 187 mmol, 2.00 equiv.) was added in portions. The reaction turned light brown and became thick with suspended solid on adding the lithium propylcyclopentadienide. The reaction was allowed to warm slowly to room temperature and stirred 17 hours. The brown mixture was filtered to give brown solid and a straw yellow solution. The solid was washed with ether (3×50 mL) and the combined ether solutions were concentrated to ~100 mL under vacuum to give a cold, white suspension. Off-white solid was isolated by filtration and dried under vacuum. Yield 33.59 g (77%). $^1H$ NMR ($CD_2Cl_2$): δ 0.92 (t, 6H, $CH_2CH_2CH_3$), 1.56 (m, 4H, $CH_2CH_2CH_3$), 2.60 (t, 4H, $CH_2CH_2CH_3$), 6.10 (m, 4H, Cp-H), 6.21 (m, 4H, Cp-H).

2. Preparation of Bis(propylcyclopentadienyl)hafnium difluoride: $(PrCp)_2HfF_2$.

To a murky green-brown solution of bis(propylcyclopentadienyl)hafnium dichloride (70.00 g, 151 mmol, 1.00 equiv.) in dichloromethane (350 mL) was added tributyltin fluoride (98.00 g, 317 mmol, 2.10 equiv.). The reaction was lighter amber after stirring 10 min. The reaction was stirred 130 minutes and then filtered through celite to give an amber solution and off-white solid. The solid was washed with dichloromethane and the combined dichloromethane solution was evaporated under vacuum, leaving a soupy manila mixture. Pentane (1 L) was added to the mixture, which was stirred 10 minutes and cooled to −35° C. The resulting off-white solid was filtered and washed with cold pentane (3×75 mL) and dried under vacuum to give a white powder. Yield 56.02 g (86%). $^1$H NMR(CD$_2$Cl$_2$): δ 0.92 (t, 6H, CH$_2$CH$_2$CH$_3$), 1.55 (m, 4H, CH$_2$CH$_2$CH$_3$), 2.47 (t, 4H, CH$_2$CH$_2$CH$_3$), 6.00 (m, 4H, Cp-H), 6.23 (m, 4H, Cp-H). $^{19}$F NMR(CD$_2$Cl$_2$): δ23.9.

Preparation of Active Catalyst

The active catalysts were made at a Al/Hf mole ratio of 120:1 and the hafnium loading on the finished catalyst was 0.685 wt % Hf using the following general procedure. Methylaluminoxane (MAO) 1140 cc of a 30 wt % solution in toluene (obtained from Albemarle Corporation, Baton Rouge, La.) was added to a clean, dry 2 gallon vessel and stirred at 60 rpm and 80° F. for 5–15 min. An additional 1500–1800 cc of toluene was added while stirring. The metallocene was dissolved in 250 cc toluene and the transfer vessel was rinsed with an additional 150 cc of toluene. The metallocene/MAO mixture was stirred at 120 rpm for 1 hour. Next, 850 g of silica, Ineos 757 (Ineos Silicas Limited, Warrington, England, dehydrated at 600° C.) was added and stirred for 55 min. The catalyst was then dried at 155° F. for 10 hours under flowing nitrogen while being stirred at 30 rpm.

The metallocene for Example 1 was bis(n-propylcyclopentadienyl) hafnium dichloride (21.6 g). The metallocene for Examples 2–6, 12–13 and Comparative Example 14 was bis(n-propylcyclopentadienyl) hafnium difluoride. The catalyst for Example 7 was prepared in a similar manner except that bis(n-propylcyclopentadienyl) hafnium dichloride was used and the silica was Davison 948 (W.R. Grace, Davison Chemical Division, Baltimore, Md., dehydrated at 600° C.). The metallocene for Comparative Example 11 was bis(n-propylcyclopentadienyl) hafnium dichloride.

Polymer Production

Using the catalyst systems described above, ethylene/1-hexene copolymer was produced according to the reaction conditions listed in Table 1.

feet per second. The fluidizing gas exiting the bed entered a resin disengaging zone located at the upper portion of the reactor. The fluidizing gas then entered a recycle loop and passed through a cycle gas compressor and water-cooled heat exchanger. The shell side water temperature was adjusted to maintain the reaction temperature to the specified value. Ethylene, hydrogen, 1-hexene and nitrogen were fed to the cycle gas loop just upstream of the compressor at quantities sufficient to maintain the desired gas concentrations. Gas concentrations were measured by an on-line vapor fraction analyzer. The catalyst was fed dry or as a mineral oil slurry (17 wt % solids) to the reactor bed through a stainless steel injection tube at a rate sufficient to maintain the desired polymer production rate. Nitrogen gas was used to disperse the catalyst into the reactor. Product was withdrawn from the reactor in batch mode into a purging vessel before it was transferred into a product drum. Residual catalyst and cocatalyst in the resin was deactivated in the product drum with a wet nitrogen purge.

The ethylene/1-hexene copolymers from Examples 7, 12, and 13 and Comparative Example 14 were produced in accordance with the following general procedure. Polymerization was conducted in a 24 inch diameter gas-phase fluidized bed reactor operating at approximately 300 psig total pressure. The reactor bed weight was approximately 600–700 pounds. Fluidizing gas was passed through the bed at a velocity of approximately 2.25 feet per second. The fluidizing gas exiting the bed entered a resin disengaging zone located at the upper portion of the reactor. The fluidizing gas then entered a recycle loop and passed through a water-cooled heat exchanger and cycle gas compressor. The shell side water temperature was adjusted to maintain the reaction temperature to the specified value. Ethylene, hydrogen, 1-hexene and nitrogen were fed to the cycle gas loop just upstream of the compressor at quantities sufficient to maintain the desired gas concentrations. Gas concentrations were measured by an on-line vapor fraction analyzer. The catalyst was fed to the reactor bed through a stainless steel injection tube at a rate sufficient to maintain the desired polymer production rate. Nitrogen gas was used to disperse the catalyst into the reactor. Product was withdrawn from the reactor in batch mode into a purging vessel before it was

TABLE 1

Reaction Conditions for Examples 1–7, 12 and 13 and Comparative Examples 11 and 14.

| | Examples | | | | | | | | | | |
|---|---|---|---|---|---|---|---|---|---|---|---|
| | 1 | 2 | 3 | 4 | 5 | 6 | 7 | 11 | 12 | 13 | 14 |
| Production Rate (lb/hr) | 29 | 39 | 31 | 29 | 36 | 38 | 150 | 58.8 | 161.1 | 157.1 | 136.1 |
| Hydrogen (ppm) | 316 | 306 | 318 | 297 | 303 | 288 | 293 | 398 | 594 | 605 | 572 |
| C$_2$ partial pres. (psia) | 240 | 240 | 220 | 220 | 220 | 220 | 252 | 220 | 252 | 252 | 220 |
| C$_6$/C$_2$ ratio | 0.0190 | 0.0196 | 0.0187 | 0.0190 | 0.0196 | 0.0194 | 0.0151 | 0.0144 | 0.0168 | 0.0169 | 0.0144 |
| Temp. (° C.) | 75 | 80 | 75 | 75 | 75 | 80 | 77 | 85 | 77 | 77 | 85 |
| Res. Time (hr) | 4.1 | 2.6 | 3.9 | 3.7 | 2.9 | 2.8 | 4.1 | 4.2 | 4.3 | 4.5 | 5.0 |

The ethylene/1-hexene copolymers from Examples 1–6 were produced in accordance with the following general procedure. Polymerization was conducted in a 14 inch diameter gas-phase fluidized bed reactor operating at approximately 350 psig total pressure. The reactor bed weight was approximately 100 pounds. Fluidizing gas was passed through the bed at a velocity of approximately 2.0 transferred into a product drum. Residual catalyst and cocatalyst in the resin was deactivated in the product drum with a wet nitrogen purge.

Granular product for Examples 1–7 was screened and dry-blended with 500 ppm Irganox® (IR) (available from Ciba-Geigy) 1076, 2000 ppm IR168 and 800 ppm Dynamar FX5920A (processing aid from Dyneon) using a doublecone blender. Pelleting of Examples 1 through 6 was carried out on a Werner & Pfleiderer ZSK 57-mm twin-screw extruder equipped with an underwater pelletizer. Output rate was approximately 175–185 lb/hr and melt temperature was 231° C. (447° F.). Example 7 was pelletized on a Farrel continuous mixer at an output rate of 500 lb/h with a specific energy input of 0.125 hp-hr/lb and a melt temperature of 219° C. Granular product for Examples 12–13 and Comparative Example 14 was screened and dry-blended with 1500 ppm IR 1076, 1500 ppn IR 168 and 900 ppm zinc oxide. Pelleting was carried out on a Werner & Pfleiderer ZSK 57-mm twin-screw extruder equipped with an underwater pelletizer. Output rate was approximately 200 lb/hr and melt temperature was 214–218° C.

Blown Film Production

Blown films were extruded on a 2.5" Battenfield Gloucester line (30:1 L:D) equipped with a 6" oscillating die. Output rate was 188 lb/hr (10 lb/hr/in die circumference) and the die gap was 60 mil. The target film gauge was 0.75 mil and BUR was held constant at 2.5. FLH was typically 19–24". A standard "hump" temperature profile was used where "BZ" is barrel zone: BZ1=310/BZ2=410/BZ3=375/BZ4=335/BZ5=335/Adapter=390/Die=390° F.

Cast films were extruded on a 3.5" Black Clawson line (30:1 L:D) equipped with a 42" slot die. Line speed was set at 750 ft/min and output was adjusted (typically 575–590 lb/h) to achieve a 0.8 mil film. A standard "hump" temperature profile was used where "BZ" is barrel zone: BZ1=350/BZ2=450/BZ3=525/BZ4=540/BZ5=540/BZ6=530/Die=550° F. The film edge was trimmed to give a 20" roll for testing.

Comparative Example 8 is NTX-095, a commercially available Super Strength or super hexene Z-N LLDPE from ExxonMobil Chemical Company. Comparative Example 9 is EXCEED® 1018CA, a commercially available mLLDPE from ExxonMobil Chemical Company. Comparative Example 10 is Escorene® LL3001.63, a commercially available Z-N LLDPE from ExxonMobil Chemical Company. Comparative Example 15 is EXCEED® 3518CB, a commercially available mLLDPE from ExxonMobil Chemical Company. Comparative Example 16 is EXCEED® 2718CB, a commercially available mLLDPE from ExxonMobil Chemical Company. Comparative Example 17 is Escorene® LL3002.32, a commercially available Z-N LLDPE from ExxonMobil Chemical Company.

Film Properties

The blown film properties and extrusion data are shown in Table II. Cast film properties and extrusion data are shown in Table III.

TABLE II

Blown Film Properties for Examples 1–7:

| | Example | | | | | | |
|---|---|---|---|---|---|---|---|
| | 1 | 2 | 3 | 4 | 5 | 6 | 7 |
| MI ($I_2$) dg/min | 0.71 | 0.96 | 0.75 | 0.95 | 0.87 | 0.97 | 0.65 |
| HLMI ($I_{21}$) dg/min | 25.8 | 23.9 | 24.3 | 29.2 | 26.7 | 24.3 | 18.9 |
| MIR ($I_{21}/I_2$) | 36.3 | 24.9 | 32.4 | 30.7 | 30.7 | 25.1 | 29.1 |
| Mw/Mn | 3.69 | 3.24 | 3.58 | 3.33 | 3.68 | 31.3 | 2.81 |
| Mz/Mw | 2.85 | 2.59 | 2.66 | 2.66 | 2.71 | 2.29 | 2.38 |
| CDBI (%) | 25.5 | 30.2 | 23.7 | 33.5 | 22.7 | 32.8 | 21.7 |
| SDBI (° C.) | 21.4 | 18.9 | 20.9 | 20.8 | 20.9 | 18.7 | 22.0 |
| Melt Strength (cN) | 5.8 | 4.5 | 5.6 | 5.2 | 5.3 | 4.3 | ~6.4 |
| Velocity (final/initial) | 26 | 35 | 26.0 | 38.0 | 31 | 30 | |
| Resin Density (g/cc) | 0.9185 | 0.9195 | 0.9164 | 0.9209 | 0.9188 | 0.9176 | 0.9195 |
| Tensile @ Yield MD (psi) | 1390 | 1400 | 1320 | 1480 | 1390 | 1300 | 1440 |
| Tensile @ Yield TD (psi) | 1510 | 1460 | 1390 | 1630 | 1500 | 1340 | N/a |
| Tensile @ Break MD (psi) | 10480 | 9270 | 10220 | 9530 | 9400 | 9780 | 10400 |
| Tensile @ Break TD (psi) | 6400 | 7090 | 7180 | 7160 | 7490 | 7510 | N/a |
| Elongation @ Break MD (%) | 290 | 350 | 290 | 330 | 320 | 360 | 300 |
| Elongation @ Break TD (%) | 610 | 620 | 620 | 650 | 630 | 610 | N/a |
| 1% Secant Modulus MD (psi) | 27370 | 26310 | 24180 | 28990 | 26230 | 22450 | 30470 |
| 1% Secant Modulus TD (psi) | 35110 | 31920 | 30610 | 38460 | 33890 | 26690 | 35910 |
| Elmendorf Tear MD (g/mil) | 640 | 550 | 610 | 710 | 610 | 390 | 760 |
| Elmendorf Tear TD (g/mil) | 620 | 540 | 540 | 550 | 560 | 510 | 650 |
| MD/TD | 1.03 | 1.02 | 1.13 | 1.29 | 1.09 | 0.76 | 1.17 |
| Dart Impact (g/mil) | 760 | 620 | 770 | 480 | 680 | 940 | 540 |
| Gauge Mic (mils) | 0.71 | 0.72 | 0.73 | 0.73 | 0.74 | 0.74 | 0.73 |
| Shrink MD (%) | 79 | 72 | 76 | 74 | 74 | 69 | 77 |
| Shrink TD (%) | −27 | −20 | −24 | −21 | −23 | −19 | −26 |
| Extrusion Parameters: | | | | | | | |
| Melt Temperature (C.) | 395 | 396 | 395 | 393 | 396 | 395 | 398 |

TABLE II-continued

| | | | | | | | |
|---|---|---|---|---|---|---|---|
| Head Pressure (psi) | 3710 | 3570 | 3780 | 3410 | 3550 | 3590 | 4110 |
| Die Pressure (psi) | 2500 | 2390 | 2540 | 2290 | 2380 | 2350 | 2730 |
| Motor Load (amps) | 62.4 | 65.8 | 64.1 | 62.5 | 63.1 | 63.6 | 69.9 |

Blown Film Properties for Comparative Examples 8–11.

| | Example | | | |
|---|---|---|---|---|
| | 8 | 9 | 10 | 11 |
| MI ($I_2$) (dg/min) | 1.00 | 0.96 | 1.01 | 1.0 |
| HLMI ($I_{21}$) (dg/min) | 25.5 | 15.6 | 31.3 | 23.5 |
| MIR ($I_{21}/I_2$) | 25.5 | 16.3 | 31.0 | 23.5 |
| Mw/Mn | 3.51 | 2.34 | 3.91 | 3.28 |
| Mz/Mw | 2.85 | 1.9 | 3.25 | 2.24 |
| CDBI (%) | 21.2 | 64.7 | 22.4 | 40.3 |
| SDBI (° C.) | 21.9 | 11.6 | 22.0 | 17.3 |
| Melt Strength (cN) | 4.6 | 3.7 | N/a | N/a |
| Velocity (final/initial) | 36 | 27 | N/a | N/a |
| Resin Density (g/cc) | 0.9226 | 0.9197 | 0.9174 | 0.9167 |
| Tensile @ Yield MD (psi) | 1250 | 1350 | 1310 | 1244 |
| Tensile @ Yield TD (psi) | 1310 | 1390 | 1400 | 1265 |
| Tensile @ Break MD (psi) | 8240 | 10310 | 9330 | 7782 |
| Tensile @ Break TD (psi) | 5570 | 6920 | 6560 | 9755 |
| Elongation @ Break MD (%) | 500 | 440 | 430 | 424 |
| Elongation @ Break TD (%) | 670 | 580 | 760 | 624 |
| 1% Secant Modulus MD (psi) | 22620 | 24250 | 27800 | 26400 |
| 1% Secant Modulus TD (psi) | 24780 | 27650 | 33680 | 32100 |
| Elmendorf Tear MD (g/mil) | 440 | 290 | 420 | 238 |
| Elmendorf Tear TD (g/mil) | 760 | 510 | 860 | 495 |
| MD/TD | 0.58 | 0.57 | 0.49 | 0.48 |
| Dart Impact (g/mil) | 170 | 510 | 190 | 1238 |
| Gauge Mic (mils) | 0.84 | 0.73 | 0.75 | 1.00 |
| Shrink MD (%) | 64 | 58 | 70 | N/a |
| Shrink TD (%) | −15 | −12 | −21 | N/a |
| Extrusion: | | | | |
| Melt Temp. (° C.) | 430 | 401 | 393 | N/a |
| Head Pressure (psi) | 3550 | 3880 | 3410 | 3490 |
| Die Pressure (psi) | 2260 | 2490 | 2290 | N/a |
| Motor Load (amps) | 62.5 | 71.3 | 64.4 | 68.6 |

TABLE III

Cast Film Properties

| | Examples: | | | | | |
|---|---|---|---|---|---|---|
| | 12 | 13 | 14 | 15 | 16 | 17 |
| MI ($I_2$) (dg/min) | 2.68 | 3.26 | 3.78 | 3.52 | 2.76 | 1.87 |
| HLMI ($I_{21}$) (dg/min) | 76.8 | 97.3 | 81.7 | 58.4 | 43.9 | 55.6 |
| MIR ($I_{21}/I_2$) | 28.7 | 29.8 | 21.6 | 16.6 | 15.9 | 29.7 |
| Mw/Mn | 3.21 | 3.43 | 3.20 | 2.45 | 2.52 | 4.40 |
| Mz/Mw | 2.40 | 2.46 | 2.17 | 1.81 | 1.74 | 2.95 |
| CDBI (%) | 28.3 | 28.5 | 49.9 | 73.8 | 70.4 | 21.3 |
| SDBI (° C.) | 20.1 | 20.1 | 16.3 | 12.7 | 12.7 | 22.2 |
| Resin Density (g/cc) | 0.9186 | 0.9201 | 0.9203 | 0.9199 | 0.9201 | 0.919 |
| Tensile @ Yield MD (psi) | 800 | 830 | 780 | 800 | 800 | 860 |
| Tensile @ Yield TD (psi) | 730 | 750 | 710 | 670 | 730 | 830 |
| Tensile @ Break MD (psi) | 7670 | 6980 | 7190 | 7690 | 7430 | 7830 |
| Tensile @ Break TD (psi) | 5060 | 4800 | 4760 | 5450 | 5690 | 4370 |

TABLE III-continued

Cast Film Properties

| | Examples: | | | | | |
|---|---|---|---|---|---|---|
| | 12 | 13 | 14 | 15 | 16 | 17 |
| Elongation @ Break MD (%) | 360 | 370 | 430 | 470 | 450 | 390 |
| Elongation @ Break TD (%) | 730 | 720 | 680 | 690 | 680 | 850 |
| 1% Secant Modulus MD (psi) | 15570 | 16350 | 16160 | 15640 | 16610 | 16480 |
| 1% Secant Modulus TD (psi) | 18010 | 18250 | 17970 | 17050 | 18050 | 19440 |
| Elmendorf Tear MD (g/mil) | 390 | 380 | 270 | 210 | 220 | 350 |
| Elmendorf Tear TD (g/mil) | 520 | 490 | 510 | 490 | 450 | 930 |
| MD/TD | 0.75 | 0.78 | 0.53 | 0.43 | 0.49 | 0.38 |
| Dart Impact (g/mil) | 190 | 160 | 160 | 180 | 260 | 100 |
| Gauge Mic (mils) | 0.80 | 0.79 | 0.76 | 0.78 | 0.80 | 0.81 |
| Extrusion Parameters: | | | | | | |
| Melt Temperature (C.) | 553 | 548 | 548 | 562 | 575 | 564 |
| Head Pressure (psi) | 3500 | 3670 | 3880 | 4310 | 4630 | 4050 |
| Die Pressure (psi) | 1060 | 970 | 920 | 1010 | 1190 | 1300 |
| Motor Load (amps) | 192 | 190 | 193 | 231 | 241 | 205 |

As shown in the Tables above, lower reactor temperatures surprisingly broadened the comonomer distribution as evidenced by a decrease in the composition distribution breadth index (CDBI) and an increase in the solubility distribution breadth index (SDBI). Furthermore, lower polymerization temperatures or increased ethylene partial pressures or both surprisingly broadened molecular weight distribution, as evidenced by an increase in Mw/Mn and Mz/Mw. Accordingly, a polyolefin film was produced having a high machine direction tear (MD tear), a high transverse direction tear (TD tear), a high 1% secant modulus, and a high dart drop impact resistance (dart).

Unless otherwise indicated, all numbers expressing quantities of ingredients, properties, reaction conditions, and so forth, used in the specification and claims are to be understood as approximations based on the desired properties sought to be obtained by the present invention, and the error of measurement, etc., and should at least be construed in light of the number of reported significant digits and by applying ordinary rounding techniques. Notwithstanding that the numerical ranges and values setting forth the broad scope of the invention are approximations, the numerical values set forth are reported as precisely as possible.

All priority documents are herein fully incorporated by reference for all jurisdictions in which such incorporation is permitted. Further, all documents cited herein, including testing procedures, are herein fully incorporated by reference for all jurisdictions in which such incorporation is permitted.

While the foregoing is directed to embodiments of the present invention, other and further embodiments of the invention may be devised without departing from the basic scope thereof, and the scope thereof is determined by the claims that follow.

The invention claimed is:

1. A method for producing a polyethylene film, comprising:

reacting ethylene and a comonomer in the presence of a hafnium-based metallocene at a temperature of from 70° C. and 90° C., an ethylene partial pressure of from 120 psia and 260 psia, and a comonomer to ethylene ratio of from 0.01 to 0.02 to produce an ethylene based polymer; and extruding the ethylene based polymer at conditions sufficient to produce a polyethylene film comprising a 1% secant modulus of greater than 25,000 psi, a dart impact resistance of greater than 500 g/mil, and a MD tear strength of greater than 500 g/mil.

2. The method of claim 1, wherein extruding comprises blown film extrusion or cast film extrusion.

3. The method of claim 1, wherein the comonomer consists essentially of 1-hexene.

4. The method of claim 1, wherein the hafnium-based metallocene is represented by the following formula:

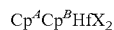

wherein each X is independently selected from the group consisting of fluorine, chlorine, iodine, bromine, and combinations thereof; and $Cp^A$ and $Cp^B$ are independently selected from the from the group consisting of cyclopentadienyl, indenyl, tetrahydroindenyl, fluorenyl, and a combination thereof.

5. The method of claim 1, wherein the hafnium-based metallocene is represented by the following formula:

wherein each X is independently selected from the group consisting of fluorine, chlorine, iodine, bromine, and combinations thereof;

$Cp^A$ and $Cp^B$ are independently selected from the from the group consisting of cyclopentadienyl, indenyl, tetrahydroindenyl, fluorenyl, and a combination thereof;

A is a divalent hydrocarbon group comprising at least one atom selected from the group consisting of carbon, oxygen, nitrogen, silicon, aluminum, boron, germanium, tin and combinations thereof; and n is an integer from 0 to 4.

6. The method of claim 1, wherein the hafnium-based metallocene comprises two symmetrically substituted cyclopentadienyl groups and a dihalide bonded to a hafnium atom.

7. The method of claim 1, wherein the hafnium-based metallocene is bis(propylcyclopentadienyl) hafnium dichloride.

8. The method of claim 1, wherein the hafnium-based metallocene is bis(propylcyclopentadienyl) hafnium difluoride.

9. The method of claim 1, wherein the temperature is from 75° C. to 80° C.

10. The method of claim 2, wherein the ethylene partial pressure is from 220 psia to 260 psia.

11. The method of claim 3, wherein the temperature is from 75° C. to 80° C. and the ethylene partial pressure is from 220 psia to 260 psia.

12. The method of claim 4, wherein the polymer is a co-polymer consisting essentially of 1-hexene and ethylene derived units.

13. The method of claim 12, wherein the polymer has a 1-hexene to ethylene molar ratio 0.0150 to 0.02.

14. The method of claim 1, wherein the polymer has a Composition Distribution Breadth Index (CDBI) of from 20% to 50% and a Solubility Distribution Breadth Index (SDBI) of from 18° C. to 22° C.

15. The method of claim 1, wherein the polymer has a Composition Distribution Breadth Index (CDBI) of from 20% to 35% and a Solubility Distribution Breadth Index (SDBI) of from 18.7° C. to 21.4° C.

16. The method of claim 1, wherein the polymer has a ratio of Z-average molecular weight to weight average molecular weight of from 2.2 to 3.

17. The method of claim 1, wherein the polymer has a ratio of Z-average molecular weight to weight average molecular weight of from 2.2 to 2.8.

18. The method of claim 1, wherein the polymer has a ratio of Z-average molecular weight to weight average molecular weight of from 2.4 to 2.8.

19. The method of claim 1, wherein the polymer has a Composition Distribution Breadth Index (CDBI) of from 20% to 50%, a Solubility Distribution Breadth Index (SDBI) of from 18° C. to 22° C., and a ratio of Z-average molecular weight to weight average molecular weight of from 2.2 to 3.

* * * * *